2,804,373
PROCESS FOR PURIFYING MAGNESIUM OXIDE

William B. Dancy, Carlsbad, N. Mex., assignor to International Minerals & Chemical Corporation, a corporation of New York No Drawing. Application May 5, 1955,
Serial No. 506,349

11 Claims. (Cl. 23—201)

This invention concerns a process for purifying crude magnesium oxide and, more particularly, a process for purifying magnesium oxide containing alkali metal sulfates, magnesium sulfates, potassium chloride, sodium chloride or boron compounds as the major contaminants.

One procedure for producing magnesium oxide involves decomposing a magnesium chloride hydrate at elevated temperatures in a rotary furnace. The magnesium chloride hydrate mixture used as a starting material is prepared from langbeinite ore. The langbeinite ore is treated in a base exchange process whereby potassium sulfate values are removed and a waste liquor is formed containing essentially magnesium chloride, potassium chloride, sodium chloride, magnesium sulfate and one or more boron compounds. This waste liquor, after purging some of the impurities therefrom, is evaporated to dryness and the dried material decomposed at an elevated temperature to produce a crude magnesium oxide product containing a considerable quantity of impurities. The crude magnesium oxide product may contain up to about 20% sulfate compounds, usually in the form of magnesium sulfate, and as much as 5% potassium chloride and 5% sodium chloride with a small quantity of boron of the order of up to about 0.06%, by weight.

This crude magnesium oxide is not useful without purification. This is not a serious problem in the case of a crude magnesium oxide containing no boron and very small quantities of sulfates, potassium chloride and sodium chloride, because very small quantities of impurities may be removed by simply calcining at a temperature of the order of about 3000° F. However, with a crude magnesium oxide containing more than about 4% sulfate compounds, and/or more than about 0.5% potassium chloride, and/or more than about 0.5% sodium chloride, and/or more than about 0.01% boron (as $B_2O_3$), the substantially complete removal of these impurities has been a problem. When these impurities are present in such large proportions, simple calcining of the crude magnesium oxide is ineffective as a means of purification.

The removal of boron from a crude magnesium oxide is particularly difficult. Simple calcination of a magnesium oxide containing boron impurities in an amount up to about 0.06% has almost no effect toward reducing the boron content. However, for certain applications magnesium oxide having a maximum boron content of about 0.002% or less is needed and such a product can be produced in accordance with this invention.

It is an object of this invention to provide a process for purifying crude magnesium oxide containing substantial quantities of impurities.

It is another object of this invention to provide a process for purifying magnesium oxide by calcination at moderate temperatures.

It is a further object of this invention to provide a process for producing a magnesium oxide which is substantially entirely free from sulfate, chloride, alkali metal and boron impurities.

In accordance with this invention, a crude magnesium oxide containing sulfates, such as magnesium sulfate or alkali metal chlorides or boron or a combination of these, as impurities, is admixed with a non-volatile carbonaceous material and the mixture heated at a temperature of at least 2400° F., preferably between about 2600° F. and about 3000° F., until the impurities are volatilized. The heating is carried out in a reaction vessel adapted to remove the volatile impurities as quickly as they are vaporized, for example, in a direct-fired rotary kiln. In order to insure intimate contact between the carbonaceous material and the impurities, the mixture of the crude magnesium oxide and the carbonaceous material is briquetted or formed into pellets prior to calcining. It has been found that heating an admixture of crude magnesium oxide with a non-volatile carbonaceous material without pelletizing the mixture does not result in a satisfactory removal of the impurities.

Forming the mixture of crude magnesium oxide and the carbonaceous material into pellets prior to calcination also serves another important function. Calcination is conveniently carried out in a direct-fired rotary kiln, and in an apparatus of this type there is a fairly rapid movement of combustion gases and air. When unpelletized material is calcined in such a furnace substantial quantities of fine material are entrained with the combustion gases and are lost. Also, the calcination of unpelletized material creates a serious dust problem in this operation and is to be avoided if possible. Pelletizing the mixture of crude magnesium oxide and carbonaceous material solves these problems.

The admixture of crude magnesium oxide and carbonaceous material can be pelleted or briquetted in any convenient apparatus. Pellets of greatest strength are prepared by adding to the mixture as much water as possible without producing a mixture which will plug the die of the pelleting machine. The quantity of water utilized in any given instance will depend to a considerable extent upon the nature of the carbonaceous material utilized. Desirably, between about 2% and about 8% water, based on the weight of the mixture of magnesium oxide, and carbonaceous material is used. Preferably, the amount of water will be between about 4% and about 7% on this same basis. The hardness and ruggedness of the ultimate pellet can be increased by the addition of a small amount of silica, for example, between about 0.5% and about 1.0% silica based on the weight of the mixture. In order to insure that the pellets will not disintegrate during calcination or handling, the pellets must be formed at a pressure of at least 6000 lbs./square inch.

The carbonaceous materials utilized in this invention are carbon-containing materials which are substantially non-volatile at temperatures of less than about 1300° F., but which provide free carbon at temperatures above about 1300° F. Materials which may be utilized include carbon black, asphalt and other petroleum distillation residues, for example, Bunker C oil. In addition, carbon-containing materials, such as cane sugar, wheat flour, starch, and the like may be used. Also included within the term "non-volatile carbonaceous material" are coal, graphite, petroleum coke, coal tar pitch, and similar materials. The carbonaceous material is employed in an amount of between about 0.5% and about 3.0% based on the weight of crude magnesium oxide. Larger quantities of carbonaceous material may be employed, but they do not increase proportionately the removal of impurities. Carbon black is a preferred carbonaceous material in that it removes impurities more effectively than other carbonaceous materials. Carbon black is conveniently employed in the form of a slurry in a petroleum liquid, such as Bunker C oil.

The process of this invention may be applied with advantage to any crude magnesium oxide material containing more than about 4% sulfates and/or more than about 0.5% potassium chloride, and/or more than about 0.5% sodium chloride, and/or more than about 0.001% boron. The invention is particularly applicable, however, to magnesium oxide produced by the decomposition of magnesium chloride hydrates containing substantial quantities of sulfates, alkali metal chlorides, and/or boron compounds. Such magnesium chloride hydrates are obtained by the evaporation and drying of magnesium chloride solutions obtained as a by-product during the recovery of potassium sulfate values from ores, such as langbeinite ore. A crude magnesium oxide produced by the decomposition of such a magnesium chloride hydrate will almost always contain proportions of magnesium sulfate, alkali metal chlorides, such as sodium and potassium chlorides, or boron compounds, above the aforementioned specified proportions and these contaminants, therefore, cannot be satisfactorily removed by simple calcination at moderate temperatures, that is, at temperatures below about 3000° F.

The following examples illustrate specific embodiments of this invention. All parts and percentages are by weight unless otherwise indicated.

EXAMPLES I THROUGH V

A crude magnesium oxide in the amount of about 100 parts and containing about 8.85% alkali metal and magnesium sulfates and 4.21% alkali metal chlorides was admixed with the carbonaceous materials shown in Table 1 in the proportions indicated. After the magnesium oxide and carbonaceous materials were thoroughly admixed, water in the amount of 5 parts was added to the mixture and the material formed into dense pellets at a pressure of about 6000 lbs./square inch. The pellets were fired in a direct-fired revolving kiln at the temperatures indicated in Table 1 and maintained at the indicated temperature for about one hour. All of the pellets passed through the kiln without disintegration. Analysis of the calcined pellets indicated that the chloride and sulfate impurities had been substantially entirely removed as indicated in Table 1.

Table 1

| Example | Carbonaceous material | lbs./100 lbs. crude MgO | Firing temp. | Product Analysis | |
|---|---|---|---|---|---|
| | | | | Cl | SO$_4$ |
| I | Carbon black | 1 | 2,450 | 0.04 | 0.005 |
| II | Asphalt | 2 | 2,410 | 0.04 | 0.005 |
| III | Wheat flour | 2 | 2,400 | 0.15 | 0.07 |
| IV | Cane sugar | 2 | 2,440 | 0.08 | 0.10 |
| V | None | 1 | 2,500 | 0.22 | 0.72 |

EXAMPLE VI

Crude magnesium oxide prepared by the decomposition of magnesium chloride dihydrate and containing alkali metal chlorides, sulfates and boron impurities as indicated in Table 2 was mixed with about 2%, by weight, of Bunker C oil, and 5%, by weight, of water based on the weight of magnesium oxide was added to the mixture. Bunker C oil is a petroleum distillation residue containing slightly more volatilizable materials than does asphalt and petroleum coke, the ultimate petroleum distillation residues. To the mixture was added about 0.7% silica in the form of diatomaceous earth. The mixture was then pelleted in a standard Komarek-Greaves machine at a pressure of about 6000 lbs./square inch. The pellets were heated in a direct-fired revolving kiln at about 2700° F. for about 4 hours. The impurities in the magnesium oxide were volatilized during the heating and removed as gases. Table 2 shows the percentages of impurities in the carbon-treated magnesium oxide as contrasted with an untreated crude magnesium oxide.

Table 2

| | K | Na | Cl | SO$_4$ | B$_2$O$_3$ | SiO$_2$ |
|---|---|---|---|---|---|---|
| Untreated crude MgO | 2.01 | 1.38 | 4.21 | 8.85 | 0.06 | None |
| Calcined with Bunker C oil | 0.005 | 0.005 | 0.03 | 0.02 | 0.005 | 0.69 |

Having thus fully described and illustrated the character of the instant invention, what is desired to be secured by Letters Patent is:

1. A process which comprises admixing crude magnesium oxide with a carbonaceous material, pelletizing said admixture, heating said pellets at a temperature of at least 2400° F. until the impurities are substantially completely volatilized and removing the volatilized impurities from the reaction mixture, said crude magnesium oxide containing as impurities at least one material selected from the group consisting of sulfates and chlorides of alkali metals and magnesium in concentrations of at least about 4% by weight of sulfate compounds and at least about 0.5% by weight of chloride compounds.

2. A process which comprises admixing crude magnesium oxide with a carbonaceous material which is non-volatile at temperatures below about 1300° F., adding to the mixture between about 2 and 8% of water based on the weight of magnesium oxide, pelletizing said admixture, heating said pellets at a temperature of at least 2400° F. until the impurities are substantially completely volatilized and removing the volatilized impurities from the reaction mixture, said crude magnesium oxide containing as impurities at least one material selected from the group consisting of sulfates and chlorides of alkali metals and magnesium in concentrations of at least about 4% by weight of sulfate compounds and at least about 0.5% by weight of chloride compounds.

3. The process of claim 2 in which the pellets are heated at a temperature between about 2400° F. and about 3000° F.

4. The process of claim 2 in which the pellets are formed at a pressure of at least 6000 lbs./square inch.

5. The process of claim 4 in which the non-volatile carbonaceous material is carbon black.

6. The process of claim 5 in which the pellets are heated at a temperature between about 2400° F. and about 3000° F.

7. The process of claim 6 in which the pellets are formed at a pressure of at least 6000 lbs./square inch.

8. The process of claim 4 in which the non-volatile carbonaceous material is asphalt.

9. A process for purifying crude magnesium oxide containing sulfates and chlorides of alkali metals and magnesium as impurities in concentrations of at least about 4% by weight of sulfate compounds and at least about 0.5% by weight of chloride compounds and prepared by decomposing a magnesium chloride hydrate which comprises admixing said crude magnesium oxide with a carbonaceous material, pelletizing said admixture, heating the pellets at a temperature of at least 2400° F. until the impurities are substantially completely volatilized, and separately removing the purified magnesium oxide from the volatilized impurities.

10. The process of claim 9 wherein the carbonaceous material is carbon black.

11. The process of claim 10 wherein the temperature is between about 2400° F. and about 3000° F., and the pelletizing pressure is at least 6000 lbs./square inch.

References Cited in the file of this patent

UNITED STATES PATENTS

| 1,063,102 | Baker | May 27, 1913 |
| 1,684,006 | Bent | Sept. 11, 1928 |
| 2,644,748 | Cunningham | July 7, 1953 |